United States Patent
Nagano

(10) Patent No.: US 12,141,615 B2
(45) Date of Patent: Nov. 12, 2024

(54) VEHICULAR CONTROL DEVICE, VEHICULAR DISPLAY SYSTEM, AND VEHICULAR DISPLAY CONTROL METHOD

(71) Applicant: DENSO CORPORATION, Kariya (JP)

(72) Inventor: Yuudai Nagano, Kariya (JP)

(73) Assignee: DENSO CORPORATION, Kariya (JP)

(*) Notice: Subject to any disclaimer, the term of this patent is extended or adjusted under 35 U.S.C. 154(b) by 368 days.

(21) Appl. No.: 17/643,265

(22) Filed: Dec. 8, 2021

(65) Prior Publication Data
US 2022/0100574 A1 Mar. 31, 2022

Related U.S. Application Data

(63) Continuation of application No. PCT/JP2020/018904, filed on May 12, 2020.

(30) Foreign Application Priority Data

Jun. 11, 2019 (JP) .................. 2019-108849

(51) Int. Cl.
*G06F 9/50* (2006.01)
*B60K 35/00* (2006.01)
*G06F 9/4401* (2018.01)

(52) U.S. Cl.
CPC ............ *G06F 9/5038* (2013.01); *B60K 35/00* (2013.01); *G06F 9/4406* (2013.01); *G06F 9/5077* (2013.01)

(58) Field of Classification Search
None
See application file for complete search history.

(56) References Cited

U.S. PATENT DOCUMENTS

| | | | |
|---|---|---|---|
| 10,242,179 B1* | 3/2019 | Corbett | G06F 21/50 |
| 10,852,954 B1* | 12/2020 | Krasner | G06F 9/45545 |
| 2002/0124072 A1* | 9/2002 | Tormasov | H04L 67/08 |
| | | | 709/223 |
| 2003/0110173 A1* | 6/2003 | Marsland | G06F 9/5077 |
| 2006/0282591 A1* | 12/2006 | Krithivas | G06F 9/4812 |
| | | | 710/269 |
| 2007/0079102 A1* | 4/2007 | Armstrong | G06F 9/5027 |
| | | | 711/173 |
| 2007/0169127 A1* | 7/2007 | Kashyap | G06F 9/5083 |
| | | | 718/104 |

(Continued)

FOREIGN PATENT DOCUMENTS

| DE | 112015000216 T5 | 9/2016 |
|---|---|---|
| JP | 2010-277177 A | 12/2010 |

*Primary Examiner* — Adam Lee
(74) *Attorney, Agent, or Firm* — Harness, Dickey & Pierce, P.L.C.

(57) ABSTRACT

The vehicular control device for displaying on the vehicular display includes: a physical processor that operates a plurality of operating systems in parallel on the virtualization software; a trigger detection unit for detecting the activation trigger; and an allocation unit. When detecting the activation trigger to activate the first operating system that executes the priority application and the second operating system as the other operating system, the allocation unit temporarily allocates the first operating system to the virtual processor cores with the allocation amount more that the predetermined allocation amount of the virtual processor cores after the activation is completed.

20 Claims, 6 Drawing Sheets

(56) References Cited

U.S. PATENT DOCUMENTS

| | | | | |
|---|---|---|---|---|
| 2008/0172554 | A1* | 7/2008 | Armstrong | G06F 9/45558 713/2 |
| 2008/0244206 | A1* | 10/2008 | Heo | G06F 12/145 711/E12.091 |
| 2009/0164991 | A1* | 6/2009 | Takashige | G06F 12/1036 718/1 |
| 2009/0240924 | A1* | 9/2009 | Yasaki | G06F 9/45558 712/E9.016 |
| 2010/0192152 | A1* | 7/2010 | Miyamoto | G06F 9/485 718/102 |
| 2011/0179417 | A1* | 7/2011 | Inakoshi | G06F 9/45558 718/1 |
| 2013/0047157 | A1* | 2/2013 | Suzuki | G06F 9/45533 718/1 |
| 2013/0047159 | A1* | 2/2013 | Low | G06F 9/5077 718/1 |
| 2013/0055206 | A1* | 2/2013 | Dudek | G06F 11/366 717/124 |
| 2013/0253672 | A1 | 9/2013 | Eschmann et al. | |
| 2013/0262801 | A1* | 10/2013 | Sancheti | H04L 67/1097 711/162 |
| 2013/0339976 | A1* | 12/2013 | Mueller | G06F 9/50 718/104 |
| 2014/0232870 | A1* | 8/2014 | Mondal | H04N 7/183 348/148 |
| 2015/0261566 | A1* | 9/2015 | Moroo | G06F 9/5088 718/104 |
| 2015/0355922 | A1 | 12/2015 | Cropper et al. | |
| 2015/0355926 | A1 | 12/2015 | Cropper et al. | |
| 2015/0355928 | A1 | 12/2015 | Cropper et al. | |
| 2015/0355929 | A1 | 12/2015 | Cropper et al. | |
| 2015/0355930 | A1 | 12/2015 | Cropper et al. | |
| 2015/0355931 | A1 | 12/2015 | Cropper et al. | |
| 2016/0216995 | A1 | 7/2016 | Cropper et al. | |
| 2016/0224390 | A1 | 8/2016 | Cropper et al. | |
| 2016/0232026 | A1 | 8/2016 | Cropper et al. | |
| 2016/0277311 | A1* | 9/2016 | Challa | H04L 67/10 |
| 2016/0328272 | A1* | 11/2016 | Ahmed | G06F 9/4881 |
| 2018/0121649 | A1* | 5/2018 | Folco | G06F 21/568 |
| 2018/0336051 | A1* | 11/2018 | Barnes | G06F 9/5083 |
| 2019/0004866 | A1* | 1/2019 | Du | G06F 9/5066 |
| 2019/0042136 | A1* | 2/2019 | Nachimuthu | H04L 49/9005 |
| 2019/0310872 | A1* | 10/2019 | Griffin | G06F 8/71 |
| 2020/0004582 | A1* | 1/2020 | Fornash | G06F 9/4856 |
| 2020/0026606 | A1* | 1/2020 | Farnum | G06F 11/07 |

* cited by examiner

VEHICULAR CONTROL DEVICE, VEHICULAR DISPLAY SYSTEM, AND VEHICULAR DISPLAY CONTROL METHOD

CROSS REFERENCE TO RELATED APPLICATION

The present application is a continuation application of International Patent Application No. PCT/JP2020/018904 filed on May 12, 2020, which designated the U.S. and claims the benefit of priority from Japanese Patent Application No. 2019-108849 filed on Jun. 11, 2019. The entire disclosures of all of the above applications are incorporated herein by reference.

TECHNICAL FIELD

The present disclosure relates to a vehicular control device, a vehicular display system, and a vehicular display control method.

BACKGROUND

Conventionally, a technique capable of executing a plurality of operating systems (i.e., OS: Operating System) in parallel is known. For example, Aa conceivable technique teaches that enables two OSs to operate in parallel on a plurality of virtual processors that are logically realized by a real processor. Such technology is called virtualization technology. Virtualization technology also allows multiple operating systems to share the same physical processor core.

SUMMARY

According to an example, a vehicular control device for displaying on the vehicular display includes: a physical processor that operates a plurality of operating systems in parallel on the virtualization software; a trigger detection unit for detecting the activation trigger; and an allocation unit. When detecting the activation trigger to activate the first operating system that executes the priority application and the second operating system as the other operating system, the allocation unit temporarily allocates the first operating system to the virtual processor cores with the allocation amount more that the predetermined allocation amount of the virtual processor cores after the activation is completed.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
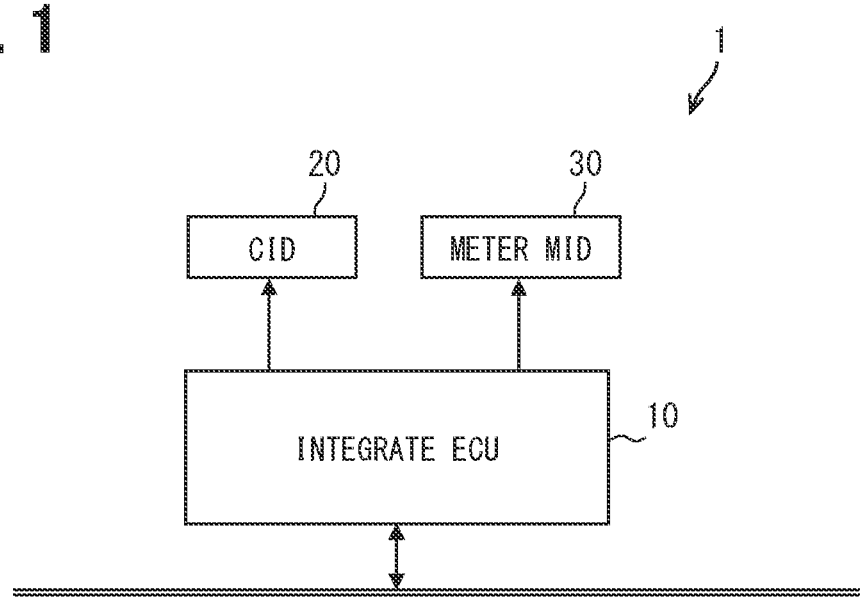
FIG. 1 is a diagram showing an example of a schematic configuration of a vehicular display system.

When a conceivable technology that enables a plurality of OSs to operate in parallel is used for a vehicular control device (hereinafter, simply a vehicular control device) for displaying on a display in the vehicle interior, the following problems can be considered.

For example, when multiple OSs share the same physical processor core (hereinafter referred to as physical core) and operate in parallel, and when some OSs freeze, the physical core accessed by the frozen OSs is not released, and there may be a difficulty that other OSs sharing the same physical core will not be able to operate. In a vehicular control device, high reliability is required for the operation of an OS executing an application that requires particularly high reliability, such as an application for drawing a meter image. Therefore, it is conceivable to improve reliability by allocating a unique physical core to each of a plurality of OSs.

However, an OS for executing an application that requires particularly high reliability is also required to have an activation performance for executing the application more quickly when the vehicular control device is activated. For example, when the vehicular control device is activated, it is required to execute the application for displaying the meter image more quickly to display the meter image.

In view of the above points, a vehicular control device, a vehicular display system, and a vehicular display control method are provided that enable a display content to be displayed quickly when the vehicular control device is activated to be displayed more quickly with improving the reliability of these operating systems when the technology for executing multiple operating systems in parallel is used for a vehicular control device that displays on a display in the vehicle compartment.

According to the first aspect of the present embodiments, a vehicular control device for displaying on a display arranged in a vehicle compartment includes: a physical processor for operating a plurality of operating systems in parallel on virtualization software by virtualization technology; a trigger detection unit that detects an activation trigger of the vehicular control device; and an allocation unit. The plurality of physical processor cores included in the physical processor are abstracted into virtual processor cores by the virtualization technology. The plurality of the operating systems includes: a first operating system, which is the operating system for executing the priority application, which is an application for displaying the display content to be displayed preferentially when the vehicular control device is activated; and a second operating system as an other operating system. When the trigger detection unit detects the activation trigger to activate the first operating system and the second operating system, the allocation unit executes a temporary allocation that temporarily allocates the first operating system to the virtual processor core with the allocation amount of the virtual processor core more than the preliminarily set allocation amount of the virtual processor core as an initial allocation amount after the activation of the first operating system is completed.

According to the second aspect of the present embodiments, the vehicular display control method for causing the vehicular control device to display on the display arranged in a vehicle compartment includes: detecting the activation trigger of the vehicular control device; abstracting a plurality of physical processor cores included in a physical processor capable of operating a plurality of operating systems in parallel on virtualization software by virtualization technology into a virtual processor core by the virtualization technology; and, when detecting the activation trigger and activating the first operating system and the second operating system, executing a temporary allocation that temporarily allocates the first operating system to the virtual processor core with the allocation amount of the virtual processor core more than the preliminarily set allocation amount of the virtual processor core as an initial allocation amount after the activation of the first operating system is completed. The plurality of the operating systems includes: a first operating system, which is the operating system for executing the priority application, which is an application for displaying the display content to be displayed preferentially when the vehicular control device is activated; and a second operating system as an other operating system.

According to these, when the activation trigger of the vehicular control device is detected and the first operating system and the second operating system capable of operating in parallel on the virtualization software are activated, a temporary allocation is executed such that the temporary allocation temporarily allocates the first operating system to the virtual processor core with the allocation amount of the virtual processor core more than the preliminarily set allocation amount of the virtual processor core as an initial allocation amount after the activation of the first operating system is completed. Therefore, it is possible to shorten the time required to complete the activation of the first operating system as compared with the case where the temporary allocation is not performed. Therefore, it is possible to more quickly execute the priority application that displays the display content that should be preferentially displayed when the vehicular control device is started, which is executed in the first operating system when the vehicular control device is activated.

Since the plurality of physical processor cores included in the physical processor are abstracted into virtual processor cores by virtualization technology, the allocation amount can be temporarily changed. Since the temporary allocation is temporary, it is possible to allocate a unique physical core for each operating system at the time of operation after the activation of the first operating system and the second operating system is completed. Therefore, it is possible to improve the reliability of each operating system.

As a result, when a technology that enables multiple operating systems to operate in parallel is used for a vehicular control device that displays on a display in the vehicle compartment, it becomes possible to display the display content that should be displayed quickly when the vehicular control device is activated while improving the reliability of these operating systems.

According to the third aspect of the present embodiments, the vehicular display system includes a display (20, 30) provided in the compartment of the vehicle and a vehicular control device (10) according to the first aspect for controlling the display to display the content.

According to this, since the above-mentioned vehicular control device is included, when a technology that enables a plurality of operating systems to operate in parallel is used for a vehicular control device that displays on a display in the vehicle compartment, it becomes possible to display the display content that should be displayed quickly when the vehicular control device is started while improving the reliability of the system.

Multiple embodiments will be described for disclosure hereinafter with reference to the drawings. For convenience of description, the parts having the same functions as the parts shown in the drawings used in the description up to that point in multiple embodiments may be designated by the same reference numerals and the description thereof may be omitted. Description in another applicable embodiment may be referred to for such a portion denoted by the identical reference sign.

Embodiment 1

<Outline Configuration of Display System 1 for Vehicles>

The following will describe a first embodiment of the present disclosure with reference to the accompanying drawings. First, the vehicular display system 1 will be described with reference to FIG. 1. The vehicular display system 1 is used in a vehicle. In the following, a case where the vehicular display system 1 is used in an automobile will be described as an example. As shown in FIG. 1, the vehicular display system 1 includes an integrated ECU 10, a center information display (hereinafter, CID) 20, and a meter multi-information display (hereinafter, meter MID) 30.

The CID 20 is a display provided in the center cluster in the compartment of the vehicle. As the CID 20, a display capable of drawing an image may be used. As the CID 20, a liquid crystal display, an organic EL display, or the like can be used. The CID 20 mainly displays information on functions having characteristics that require convenience and comfort rather than safety and security. As an example, the CID 20 mainly displays information on infotainment functions such as navigation information, audio information, and air conditioning information. The infotainment function referred to here is a function related to convenience and comfort other than safety and security.

The navigation information is information related to the navigation function, such as a route guidance image. The audio information is an image or the like related to the operation of the audio device. The air conditioning information is an image or the like related to the operation of the air conditioning equipment. In addition to the infotainment function information, the CID 20 also displays information on the startup screen. The information on the start-up screen is, for example, an image related to the hospitality effect when the vehicle door is opened (hereinafter, welcome image), an image related to the opening effect when the vehicle is started (hereinafter, opening image), and the like. The welcome image is an image displayed when the vehicle door is opened, and is an image displayed before the vehicle is activated. The opening image is an image displayed when the vehicle is activated. The welcome image and the opening image may be configured to be displayed as an animation, for example, by displaying a plurality of still images in chronological order. The air conditioning information is an image or the like related to the operation of the air conditioning equipment.

The meter MID30 is a display provided in front of the driver's seat in the compartment of the vehicle. As an example, the meter MID30 may be configured to be provided on the meter panel. As the meter MID 30, a display capable of drawing an image may be used. As the meter MID 30, a liquid crystal display, an organic EL display, or the like can be used. The meter MID 30 mainly displays information on functions having characteristics that require safety and security rather than convenience and comfort. As an example, the meter MID 30 mainly displays information on safety and security functions such as meter information.

The meter information is an image or the like related to the meter display. In addition to the information on the safety and security function, the meter MID30 also displays information on the startup screen, simplified navigation information, and the like. The information on the startup screen is, for example, the above-mentioned welcome image, opening image, and the like, and the welcome image and the opening image displayed on the meter MID30 may be or may not be the same as the welcome image and opening image displayed on the CID20. The simplified navigation information is information of the infotainment function, which is more simplified than the navigation information displayed by the CID 20. For example, it is a simplified route guidance image such as a display showing the next traveling direction.

The integrated ECU 10 is an ECU (Electronic Control Unit) that integrates a function of controlling the CID 20 and a function of controlling the meter MID 30. The integrated ECU 10 is connected to the CID 20 and the meter MID 30, and draws and displays various images on the CID 20 and the meter MID 30.

The integrated ECU 10 is also connected to the in-vehicle LAN, and information from a sensor connected to the in-vehicle LAN, another ECU, or the like is input. The image drawn by the integrated ECU 10 on the CID 20 and the meter MID 30 corresponds to the output information of the integrated ECU 10. The information input to the integrated ECU 10 via the in-vehicle LAN corresponds to the input information of the integrated ECU 10. The input information includes vehicle information such as vehicle speed and mileage, digital TV image information, smartphone cooperation information linked with a smartphone, and the like. The integrated ECU 10 has a configuration in which input information and output information are collectively managed, and the input source and output destination of various information can be freely rearranged.

The integrated ECU 10 mainly includes, for example, a microcomputer (hereinafter, a microcomputer) with a processor, a memory, an I/O, and a bus connecting these. The processor referred to here is a physical processor (hereinafter referred to as a physical processor) including an arithmetic unit, registers, and the like. The integrated ECU 10 executes various processes related to the displaying of an image on the CID 20 and the meter MID 30 by executing a control program stored in the non-volatile memory. In particular, in the present embodiment, the integrated ECU 10 enables a plurality of OSs to operate in parallel on the virtualization software, and enables each of the plurality of OSs to execute processing related to image display. The integrated ECU 10 corresponds to a vehicular control device. Further, the executing of the process in the integrated ECU 10 corresponds to the executing of the vehicular display control method. The memory referred to here is a non-transitory tangible storage medium for storing programs and data that can be read by a computer non-transitory way. The non-transitory tangible storage medium is realized by a semiconductor memory, a magnetic disk, or the like. The details of the integrated ECU 10 will be described below.

<Outline Configuration of Integrated ECU 10>

Figure 2:
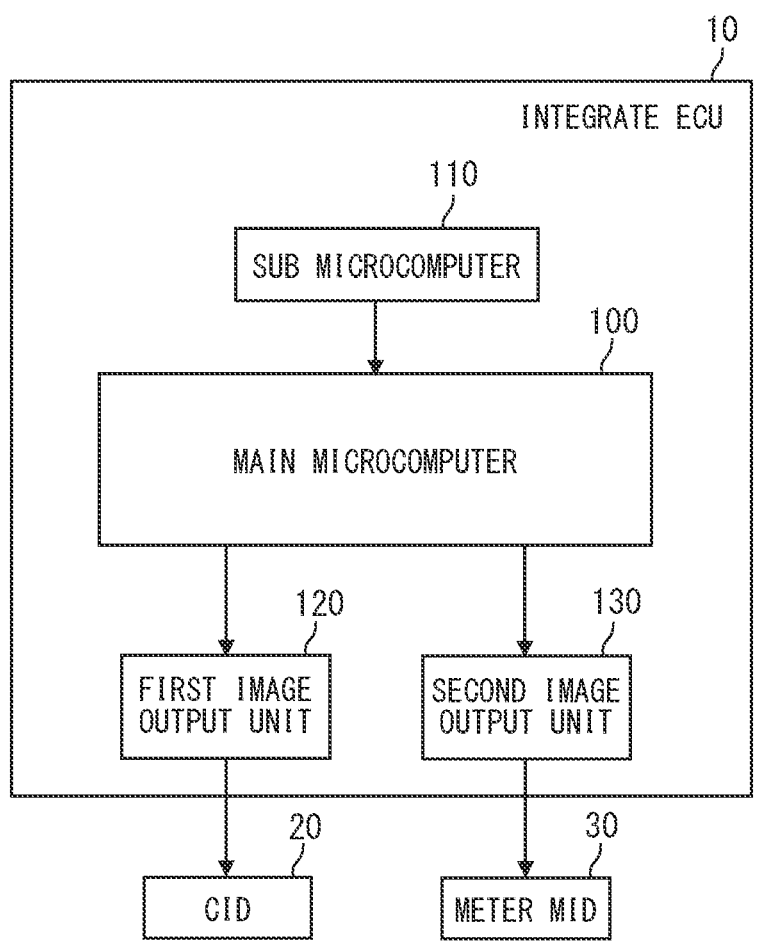
FIG. 2 is a diagram showing an example of a schematic configuration of the integrated ECU.

Subsequently, an example of the schematic configuration of the integrated ECU 10 will be described with reference to FIG. 2. FIG. 2 shows an example of a configuration for displaying an image on the CID 20 and the meter MID 30 for convenience. The integrated ECU 10 includes a main microcomputer 100, a sub-microcomputer 110, a first image output unit 120, and a second image output unit 130. In addition, a part or all of the functions executed by the integrated ECU 10 may be configured as a hardware, such as one or more of ICs or the like.

The main microcomputer 100 controls the image to be displayed on the CID 20 and the image to be displayed on the meter MID 30. As an example, the main microcomputer 100 displays a content image (hereinafter, priority image) that should be preferentially displayed when the integrated ECU 10 is activated. The priority here means, for example, to display the information prior to the information of the infotainment function. An example of priority display content is the display of information on safety and security functions that should be displayed prior to other displays, such as meter display. An application for displaying the priority display content is hereinafter referred to as a priority application. Examples of the priority image include an image captured by a rear view camera, and the like, and it will be described below by taking a meter display as an example.

The sub-microcomputer 110 has a function of controlling the on/off of the main microcomputer 100 and the like. When the sub-microcomputer 110 detects the activation trigger of the integrated ECU 10, the sub-microcomputer 110 activates the main microcomputer 100. This sub-microcomputer 110 corresponds to the trigger detection unit. Examples of the activation trigger include a rise in the power supply voltage above a certain level, acquisition of a wake-up signal from the in-vehicle LAN, and the like. The activation trigger occurs when the user starts using the vehicle. The time when the user starts using the vehicle includes the time when the vehicle is activated by turning on the switch (hereinafter referred to as the power switch) for starting the internal combustion engine or the motor generator of the vehicle, the vehicle door opening time when the vehicle door is opened, and so on.

The first image output unit 120 outputs an image to be displayed on the CID 20 generated by the main microcomputer 100 to the CID 20, and draws this image on the CID 20. As the first image output unit 120, for example, an IC may be used. The second image output unit 130 outputs an image to be displayed on the meter MID 30 generated by the main microcomputer 100 to the meter MID 30, and draws this image on the meter MID 30. As the second image output unit 130, for example, an IC may be used.

Further, the integrated ECU 10 abstracts the hardware resources of the main microcomputer 100 by virtualization technology, and enables a single main microcomputer 100 to operate a plurality of operating systems (hereinafter, OS) in parallel. The integrated ECU 10 abstracts the physical processor of the main microcomputer 100 by executing the control program of the virtualization software stored in the non-volatile memory, and enables a plurality of OSs to operate in parallel on the virtualization software.

More specifically, the integrated ECU 10 operates each OS by abstracting the physical processor into a plurality of virtual processor cores by virtualization technology and assigning different virtual processor cores (hereinafter, virtual cores) to each OS. Virtualization software uses the resources of the physical processor in a time-division manner on a dock-by-clock basis to operate as if multiple cores (that is, virtual cores) exist virtually, so that the OS can be operated by different virtual cores. The physical processor may include a plurality of physical processor cores (hereinafter referred to as a physical cores). The number of physical cores included in the physical processor may be a plurality, and the following description will be made assuming that the number of physical cores is four in the present embodiment.

The virtualization software may manage the virtual core by associating it with a thread (hereinafter, logical core), which is the minimum processing unit executed by the physical core. For example, when the physical core of the present embodiment uses Simultaneous Multithreading Technology (SMT) to execute two threads in parallel on one physical core, the number of logical cores is eight. On the other hand, when the physical cores of the present embodiment do not execute two threads in parallel on one physical core, the number of logical cores is four, which is the same as the number of physical cores.

The link between the virtual core and the logical core may not be necessarily limited to a 1:1 ratio, and a plurality of virtual cores may be linked to one logical core. In the present embodiment, for convenience, the following description will be given by taking as an example a case where a plurality of logical cores are not associated with one virtual core. Further, the total amount of virtual cores that the virtualization software can allocate to the OS (hereinafter, the allowable total amount) is not the same as the total amount of resources of the physical processor. For example, the total allowable amount of virtual cores does not include the resources required for the operation of virtualization software. In addition, even if the number of logical cores that can be accessed by one OS is the total number of logical cores, so that the allowable total amount of virtual cores is allocated, the resource usage rate of all logical cores does not reach 100%.

The virtualization software is dedicated to virtualization that manages the operating state of the virtual processor core and realizes virtualization. As an example, the case where a hypervisor (Hypervisor) is used as the virtualization software will be described below as an example. In the following, a case where two OSs can be operated in parallel on a hypervisor by virtualization technology will be described as an example.

<Conceptual Configuration of the Physical Processor 101 of the Main Microcomputer 100>

Figure 3:
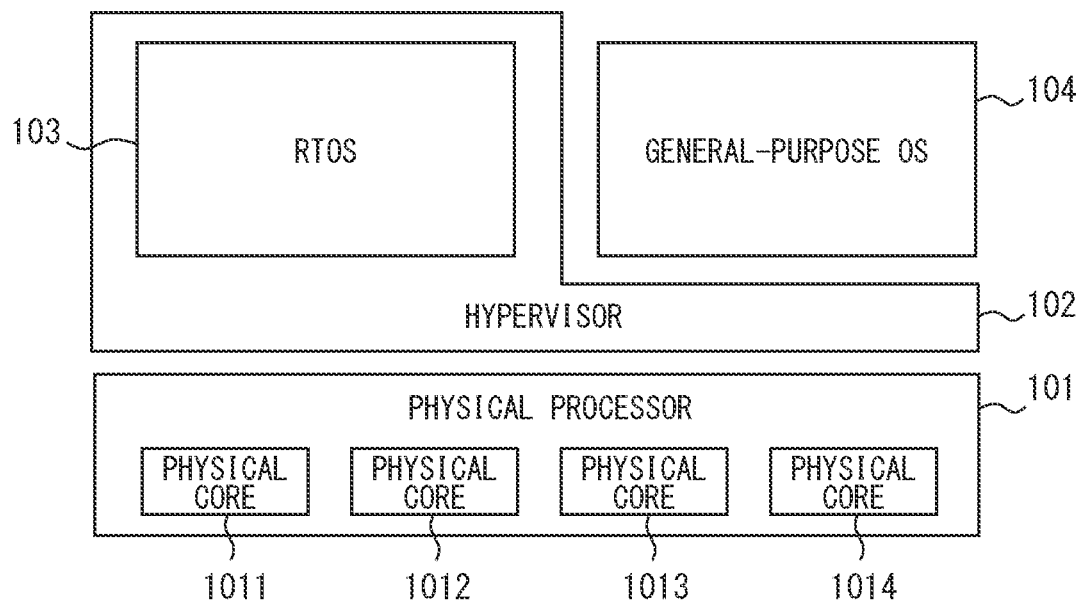
FIG. 3 is a diagram showing an example of a conceptual configuration of a physical processor of the main microcomputer according to the first embodiment.

Here, an example of the conceptual configuration of the physical processor 101 of the main microcomputer 100 according to the first embodiment will be described with reference to FIG. 3. Here, a case where a real-time operating system (hereinafter, RTOS) 103 having real-time characteristics and a general-purpose operating system (hereinafter, general-purpose OS) 104 are used as the two OSs will be described as an example. The RTOS 103 may be, for example, QNX (registered trademark). The general-purpose OS 104 may be, for example, Linux (registered trademark).

The main microcomputer 100 mounts a hypervisor 102 on a physical processor 101 including four physical cores 1011, 1012, 1013, and 1014. Hereinafter, the case where the physical cores 1011 to 1014 of the present embodiment do not execute two threads in parallel on one physical core will be described as an example. Therefore, the physical cores 1011 to 1014 are logical cores, respectively. That is, there are four logical cores.

The hypervisor 102 can operate the RTOS 103 and the general-purpose OS 104 in parallel on the virtual core from which the physical processor 101 is extracted. Here, the hypervisor 102 and the RTOS 103 have a common microkernel (hereinafter referred to as a kernel). The RTOS 103 corresponds to the first operating system, and the general-purpose OS 104 corresponds to the second operating system.

Since the RTOS 103 has real-time characteristics, it executes the above-mentioned application related to the safety/security function. The above-mentioned priority application may be included in the application related to this safety/security function. On the other hand, the general-purpose OS 104 executes an application related to the above-mentioned infotainment function. The RTOS 103 generates an image related to the safety/security function as the application related to the safety/security function is executed. The RTOS 103 generates a priority image such as a meter display when executing a priority application. The general-purpose OS 104 generates an image related to the infotainment function as the application related to the infotainment function is executed.

<Operation when the Main Microcomputer 100 is Activated>

Figure 4:
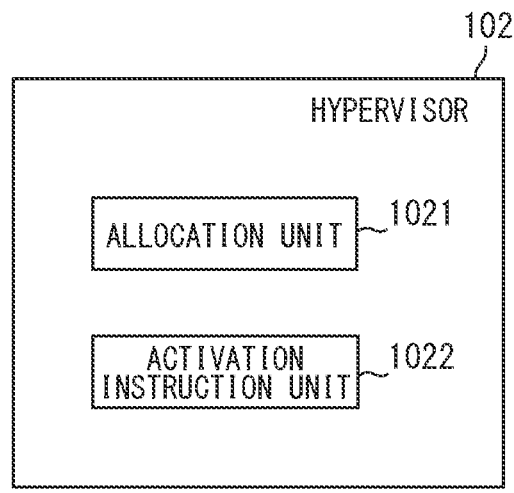
FIG. 4 is a diagram showing an example of a schematic configuration of a hypervisor regarding temporary allocation.

Subsequently, the operation at the time of starting the main microcomputer 100 will be described with reference to the time chart of FIG. 4. Hereinafter, a case where an image is displayed on the meter MID 30 will be described as an example.

The activation of the main microcomputer 100 is started by the sub-microcomputer 110 that has detected the activation trigger. When the main microcomputer 100 is activated, the construction of the hypervisor 102 is first started. Here, since the kernel of the RTOS 103 is common to that of the hypervisor 102, preparations for activating the RTOS 103 are started at the same time as the establishment of the hypervisor 102. Subsequently, when the establishment of the hypervisor 102 proceeds to the stage where the preparation for activating the general-purpose OS 104 can be started, the preparation for activating the general-purpose OS 104 is started. Since the preparation for activating the general-purpose OS 104 cannot be started unless the construction of the hypervisor 102 proceeds, the preparation for activating the general-purpose OS 104 is started later than the preparation for activating the RTOS 103.

When the construction of the hypervisor 102 progresses and the preparation for activating the RTOS 103 reaches the stage where the priority application can be executed, the RTOS 103 executes the priority application on the hypervisor 102. The construction of the hypervisor 102 is completed by booting the kernel and completing the activation of a plurality of drivers. The priority application can be executed even before the construction of the hypervisor 102 is completed.

As an example, the RTOS 103 can execute a plurality of applications including the priority application when the startup is completed, and can execute the priority application before the startup is completed. The feature that the priority application can be executed is defined below as the completion of activation of the priority application. When the RTOS 103 is an OS that does not execute anything other than the priority application, the completion of activating the priority application may be the completion of the activating the RTOS 103.

When the RTOS 103 executes the priority application, the RTOS 103 generates a priority image. For example, when the RTOS 103 generates an image for meter display as a priority image, the second image output unit 130 outputs this image to the meter MID 30 and draws an image for meter display on the meter MID 30.

Since the preparation for activating the general-purpose OS 104 is started later than the preparation for activating the RTOS 103, the application can be executed on the general-purpose OS 104 later than the RTOS 103 generates the priority image. The general-purpose OS 104 executes an application for displaying information on the infotainment function, and generates an image for displaying the information on the infotainment function (hereinafter, an infotainment-type image).

For example, when the general-purpose OS 104 generates an infotainment image, the first image output unit 120 outputs the infotainment image to the CID 20 and draws the infotainment image on the CID 20. Regarding the infotainment image to be displayed on the meter MID30, for example, the RTOS 103 synthesizes the image generated by the RTOS 103 and the infotainment image generated by the general-purpose OS 104, and outputs the synthesized image to the second image output unit 130.

<Outline Configuration of Hypervisor 102>

In the main microcomputer 100, when the RTOS 103 and the general-purpose OS 104 are activated, the hypervisor 102 temporarily increases the amount of virtual cores allocated to the RTOS 103 to execute the temporary allocation, thereby accelerating the progress of preparation for activating the RTOS 103. Here, the configuration of the hypervisor 102 regarding temporary allocation will be described with reference to FIG. 4. As shown in FIG. 4, the hypervisor 102 includes an allocation unit 1021 and an activation instruction unit 1022 as functional blocks.

The allocation unit 1021 executes the temporary allocation for temporarily allocating more virtual cores to the RTOS 103 than the virtual core allocation amount preliminarily set as the allocation amount after the activation of the RTOS 103 is completed. As a result, it is possible to shorten the time required to complete the activation of the RTOS 103 as compared with the case where the temporary allocation is not performed. Therefore, the priority image to be displayed by the priority application executed by the RTOS 103 can be displayed more quickly. As a result, the display content to be displayed quickly when the integrated ECU 10 is activated can be displayed more quickly. For example, the allocation unit 1021 may be configured to change the allocation of the virtual cores to the OS by changing the association between the OS and the virtual core. In this embodiment, since the kernels of the hypervisor 102 and the RTOS 103 are common, the RTOS 103 may control the allocation unit 1021.

The allocation amount after the activation of the RTOS 103 and the general-purpose OS 104 is completed (hereinafter, the allocation amount during operation) may be fixed and set in advance so that one or more different physical cores 1011 to 1014 are allocated to each of the RTOS 103 and the general-purpose OS 104. In the example of the present embodiment, the virtual core assigned to the RTOS 103 may be fixed and set in advance to a virtual core that is associated with the logical core corresponding to the physical cores 1011 and 1012 but not associated with the logical core corresponding to the physical cores 1013 and 1014. On the other hand, the virtual core allocated to the general-purpose S104 may be fixed and set in advance to a virtual core that is associated with the logical core corresponding to the physical cores 1013 and 1014 but not associated with the logical core corresponding to the physical cores 101 and 1012.

According to this, when the RTOS 103 and the general-purpose OS 104 are operated after the activation is completed, the reliability of the RTOS 103 and the general-purpose OS 104 can be improved by allocating a unique physical core to each of the RTOS 103 and the general-purpose OS 104. As a result, while improving the reliability of the RTOS 103 and the general-purpose OS 104, it is possible to more quickly display the display content that should be displayed when the integrated ECU 10 is activated.

Further, the allocation amount during operation may be fixed and set in advance so that one or more different physical cores 1011 to 1014 are allocated to each of the RTOS 103 and the general-purpose OS 104, and the physical cores sharing the cache are allocated to the same OS. This is because if the physical cores that share the cache are allocated to different OSs, the physical cores to which the frozen OS was accessing will not be released, and other OSs, to which the physical cores that shared the cache with this physical core is allocated, may not be able to operate.

For example, in the example of the present embodiment, when the physical core 1011 and the physical core 1002 share the cache, and the physical core 1013 and the physical core 1014 share the cache, the following may be performed. The virtual core associated with the logical core corresponding to the physical core 1011 and the virtual core associated with the logical core corresponding to the physical core 1012 may not be allocated to different OSs. Further, the virtual core associated with the logical core corresponding to the physical core 1013 and the virtual core associated with the logical core corresponding to the physical core 1014 may not be allocated to different OSs.

According to this, it becomes possible to further improve the reliability of the RTOS 103 and the general-purpose OS 104. As a result, while improving the reliability of the RTOS 103 and the general-purpose OS 104, it is possible to more quickly display the display content that should be displayed when the integrated ECU 10 is activated.

Figure 5:
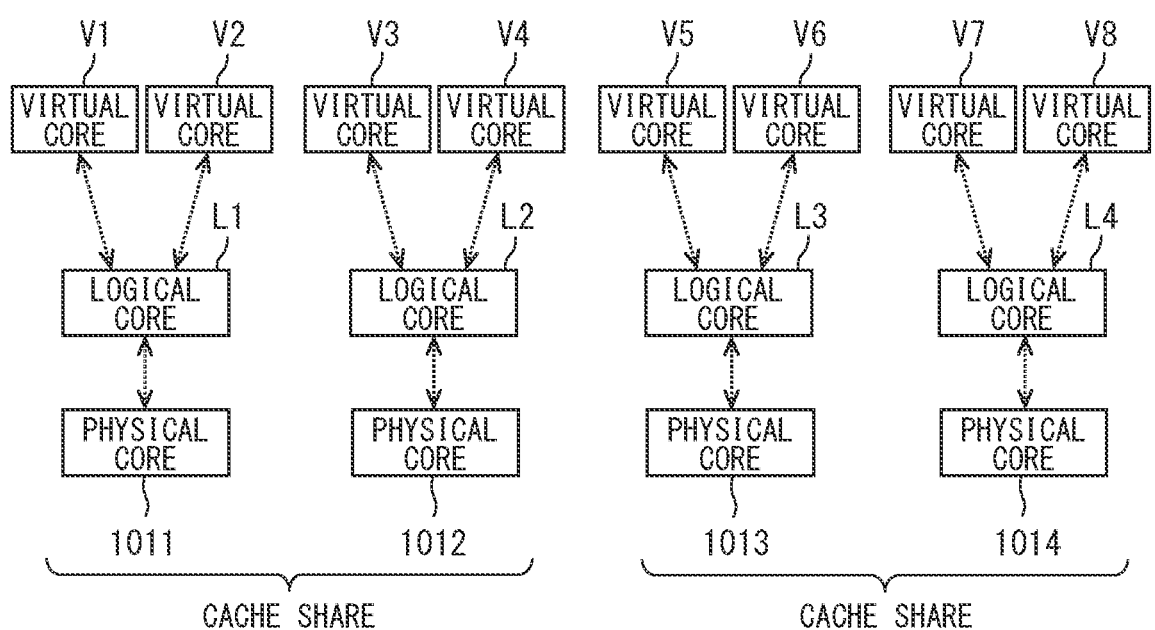
FIG. 5 is a schematic diagram for explaining an example of an allocation amount at the operating time.

Here, an example of the allocation amount during operation will be described with reference to FIG. 5. In FIG. 5, a case where one logical core L1 to L4 corresponds to each of the physical cores 1011 to 1014 will be taken as an example. In FIG. 5, a case where two virtual cores V1 to V8 correspond to each of the logical cores L1 to L4 will be taken as an example. The logical core L1 corresponds to the physical core 1011 and the virtual cores V1 and V2 are associated with the logical core L1. The logical core L2 corresponds to the physical core 1012, and the virtual cores V3 and V4 are associated with the logical core L2. The logical core L3 corresponds to the physical core 1013, and the virtual cores V5 and V6 are associated with the logical core L3. The logical core L4 corresponds to the physical core 1014, and the virtual cores V7 and V8 are associated with the logical core L4. In FIG. 5, the cache is shared between the physical core 1011 and the physical core 1012, and between the physical core 1013 and the physical core 1014.

In the example of FIG. 5, the virtual cores in the same combination such as the combination of virtual cores V1 and V2, the combination of virtual cores V3 and V4, the combination of virtual cores V5 and V6, and the combination of virtual cores V7 and V8 are not allocated to different OSs, so that one or more different physical cores 1011 to 1014 are allocated to each of the RTOS 103 and the general-purpose OS 104, respectively. Further, in the example of FIG. 5, the allocation that does not allocate the virtual cores in the same combination such as the combination of virtual cores V1 to V4 and the combination of virtual cores V5 to V8 to different OSs is equal to the allocation of the virtual cores that allocates one or more different physical cores 1011 to 1014 to each of the RTOS 103 and the general-purpose OS 104, respectively, and allocates the physical cores that share the cache to the same OS.

It may be preferable that the allocation unit 1021 allocates the entire amount of virtual cores that can be allocated to the RTOS 103 and the general-purpose OS 104 to the RTOS 103 at the time of temporary allocation. Allocating the total amount of virtual cores that can be allocated to the RTOS 103 and the general-purpose OS 104 as used herein does not always mean that the total amount of resources of the physical processor 101 is allocated. It means that the resources of the physical processor 101, excluding the resources required other than the RTOS 103 and the general-purpose OS 104 for
such as the resources for operations of the hypervisor 102, are allocated. As an example, the virtual cores are allocated such that the RTOS 103 may be configured to use all the logical cores, while the general-purpose OS 104 may be configured not to use any logical cores. Even when the RTOS 103 is made to use all the logical cores, the resource usage rate of all the logical cores does not reach 100%.

According to this, the resources of the physical processor 101 that can be allocated to the OS that operates on the hypervisor 102 can be allocated to the activation preparation of the RTOS 103. Therefore, it is possible to further shorten the time required to complete the activation of the RTOS 103. Therefore, the priority image to be displayed by the priority application executed by the RTOS 103 can be displayed more quickly. As a result, the display content to be displayed quickly when the integrated ECU 10 is activated can be displayed more quickly.

It may be preferable that the allocation unit 1021 starts the temporary allocation before the preparation for activating the general-purpose OS 104 is started. According to this, the resources of the physical processor 101 that can be allocated to the OS that operates on the hypervisor 102 can be concentrated to the activation preparation of the RTOS 103 without wasting resources. Therefore, it is possible to further shorten the time required to complete the activation of the RTOS 103.

It may be preferable that the allocation unit 1021 terminates the temporary allocation at the latest when the activation of the RTOS 103 is completed. According to this, after displaying the display content to be displayed more quickly when the integrated ECU 10 is activated, the temporary allocation is finished so that the resources of the physical processor 101 to be allocated to the general-purpose OS 104 are increased, and the time required for completing the activation of the general-purpose OS 104 is reduced.

The allocation unit 1021 may preferably terminates the temporary allocation when the activation of the priority application is completed. According to this, after displaying the display content to be displayed more quickly when the integrated ECU 10 is activated, the temporary allocation is finished more quickly so that the resources of the physical processor 101 to be allocated to the general-purpose OS 104 are increased, and the time required for completing the activation of the general-purpose OS 104 further is reduced.

After the activation of the RTOS 103 and the general-purpose OS 104 is completed, the allocation unit 1021 may preferably allocate the above-mentioned operating allocation amount, which is fixed and set in advance as the allocation amount after completing the activation of the RTOS 103 and the general-purpose OS 104, to the RTOS 103 and the general-purpose OS 104, respectively. According to this, when the RTOS 103 and the general-purpose OS 104 are operated after the activation is completed, the reliability of the RTOS 103 and the general-purpose OS 104 can be improved by allocating a unique physical core to each of the RTOS 103 and the general-purpose OS 104.

After the activation of the priority application is completed, the allocation unit 1021 allocates the above-mentioned operating allocation amount, which is fixed and set in advance as the allocation amount after completing the activation of the RTOS 103 and the general-purpose OS 104, may be preferably allocated to the RTOS 103 and the general-purpose OS 104, respectively. According to this, after the activation of the application executed by the RTOS 103 is completed, the reliability at the time of executing the application by the RTOS 103 can be improved by allocating an unique physical core to each of the RTOS 103 and the general-purpose OS 104. The activation instruction unit 1023 starts the activation preparation of the general-purpose OS 104 based on the progress of the construction of the hypervisor 102 and the enablement of starting the activation preparation of the general-purpose OS 104. It may be preferable that the activation instruction unit 1023 does not start the activation preparation of the general-purpose OS 104 until the activation preparation of the RTOS 103 reaches a predetermined stage. The predetermined stage referred to here may be, for example, a stage at which the priority application can be executed on the RTOS 103. According to this, it is possible to concentrate the hardware resources of the physical processor 101 on the preparation for activating the RTOS 103 until the preparation for activating the RTOS 103 reaches a predetermined stage, and the priority application on the RTOS 103 can be executed more quickly.

<Temporary Allocation Related Processing in Hypervisor 102>

Figure 6:
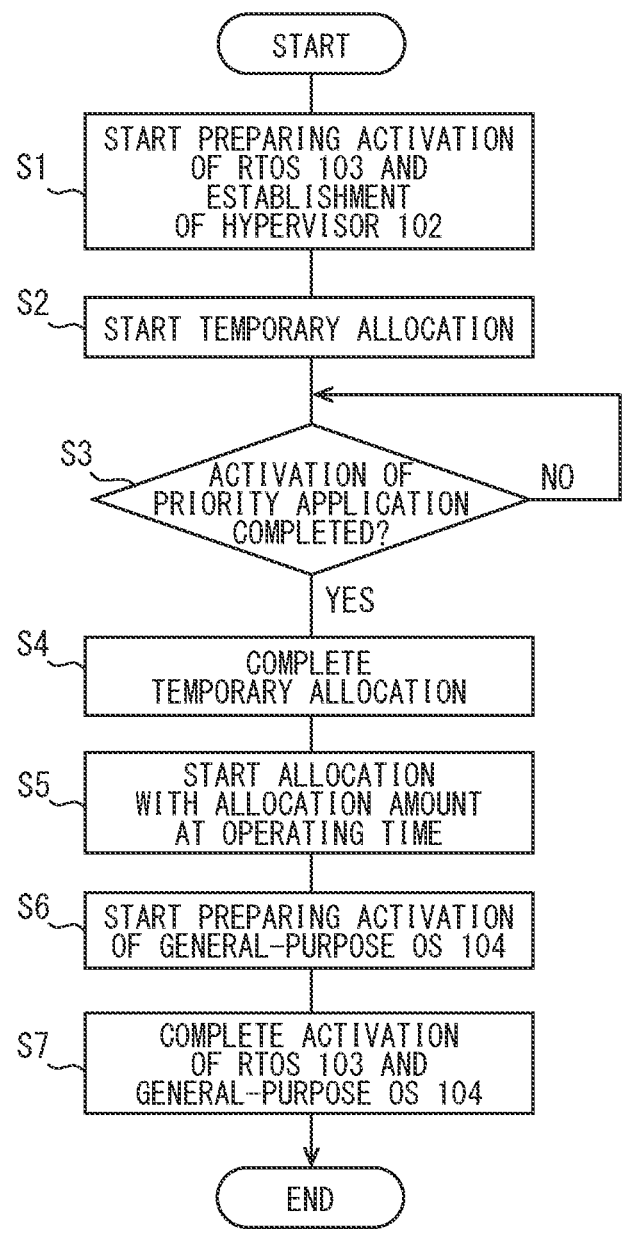
FIG. 6 is a flowchart showing an example of a flow of temporary allocation-related processing in the hypervisor.

Here, an example of a flow of processing related to temporary allocation in the hypervisor 102 (hereinafter, temporary allocation related processing) will be described with reference to the flowchart of FIG. 6. Further, the relationship between the operating state of the RTOS 103 and the general-purpose OS 104 and the change in the allocation of the virtual cores in the hypervisor 102 will be described using the time chart of FIG. 7. The flowchart of FIG. 6 may be configured to start when the activation of the main microcomputer 100 is started by the sub-microcomputer 110 that has detected the start trigger.

First, in step S1, the construction of the hypervisor 102 and the preparation for activating the RTOS 103 are started. In step S2, the allocation unit 1021 allocates the entire amount of virtual cores that can be allocated to the RTOS 103 and the general-purpose OS 104 to the RTOS 103. In the example of this embodiment, the temporary allocation for allocating the virtual cores is started such that the RTOS 103 is controlled to use all four logical cores, while the general-purpose OS 104 is controlled not to use any logical cores. That is, the virtual core is allocated with a ration of RTOS 103:general-purpose OS 104=4:0.

Figure 7:
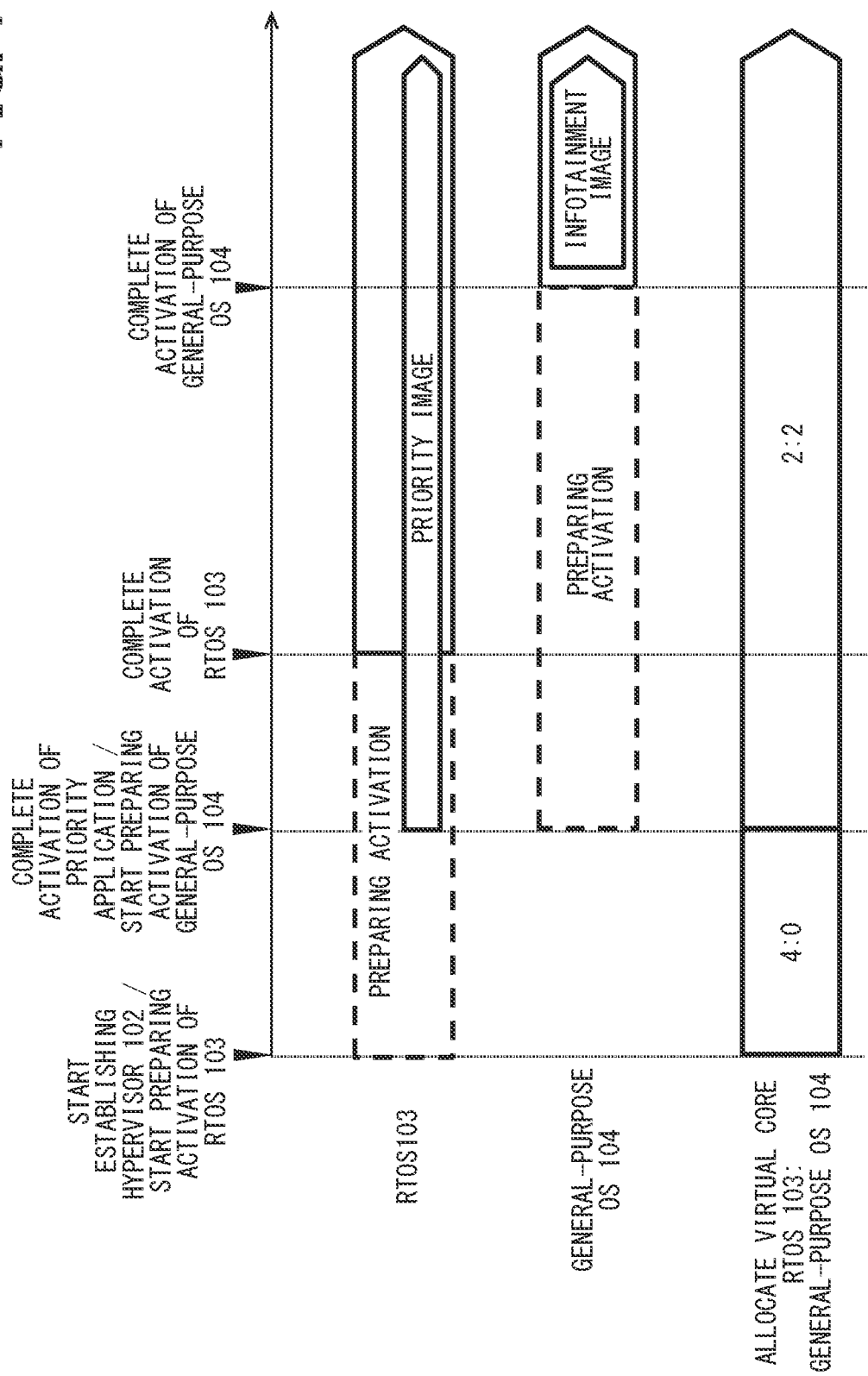
FIG. 7 is a time chart showing an example of the relationship between the operating state of the RTOS and the general-purpose OS and the change in the allocation of virtual cores in the hypervisor.

As shown in FIG. 7, preparations for activating the RTOS 103 are started at the same time as the construction of the hypervisor 102 is started. Then, when the preparation for activating the RTOS 103 is started, the temporary allocation is started.

In step S3, when the activation of the priority application in the RTOS 103 is completed (YES in S3), the process proceeds to step S4. On the other hand, when the activation of the priority application in the RTOS 103 is not completed (NO in S3), the process of S3 is repeated.

As shown in FIG. 7, the activation of the priority application in the RTOS 103 is completed after the preparation for activating the RTOS 103 is started and before the activation of the RTOS 103 is completed. In FIG. 7, a configuration in which a plurality of applications including a priority application can be executed when the activation of the RTOS 103 is completed is described as an example. When the RTOS 103 is an OS that does not execute anything other than the priority application, the completion of activating the priority application may be the completion of the activating the RTOS 103.

In step S4, the allocation unit 1021 ends the temporary allocation. In step S5, the allocation unit 1021 starts the operation-time allocation that allocates the operation-time allocation amount, which is the allocation amount of the virtual cores after the activation of the RTOS 103 and the general-purpose OS 104, to each of the RTOS 103 and the general-purpose OS 104. In the example of this embodiment, the virtual cores are allocated so that the RTOS 103 uses two logical cores, while the general-purpose OS 104 uses two logical cores that the RTOS 103 does not use. That is, the virtual core is allocated with a ration of RTOS 103:general-purpose OS 104=2:2.

In step S6, the activation instruction unit 1022 starts the activation preparation of the general-purpose OS 104. In step S7, the activation of both the RTOS 103 and the general-purpose OS 104 is completed, and the temporary allocation-related processing is completed.

As shown in FIG. 7, when the activation of the priority application is completed, the preparation for activating the general-purpose OS 104 is started. In addition, when the activation of the priority application is completed, the temporary allocation ends and the operation-time allocation is started. For example, the preparation for activating the general-purpose OS 104 may be configured to be started after the allocation at the time of operation is started. Further, when the activation of the priority application is completed and the display of the priority image by the priority application is first started on the meter MID 30 at the time of activating the integrated ECU 10, the temporary allocation may be terminated. For example, at the time when the priority image is displayed, the temporary allocation may be completed.

After the activation of the RTOS 103 is completed, the activation of the general-purpose OS 104 is completed with a delay. The general-purpose OS 104 that has been activated will display infotainment-type images. Here, the operating-time allocation amount does not vary even after the activation of both the RTOS 103 and the general-purpose OS 104 is completed after the operating-time allocation is performed after the temporary allocation is completed. The operating-time allocation amount is fixed and maintained in advance to the predetermined allocation amount during the operation of the RTOS 103 and the general-purpose OS 104. As a result, the reliability of the RTOS 103 and the general-purpose OS 104 is improved by continuing to allocate a unique physical core to each of the RTOS 103 and the general-purpose OS 104 even during the operation of the RTOS 103 and the general-purpose OS 104. In order to improve the reliability of the RTOS 103 and the general-purpose OS 104 during the operation of the RTOS 103 and the general-purpose OS 104, it may not be preferable to continue the temporary allocation until the operation of both the RTOS 103 and the general-purpose OS 104.

In the present embodiment, the meter display and the image captured by the rear view camera are taken as examples as the priority image, alternatively, the configuration may include an activation screen such as an opening image to be displayed on the CID 20 and the meter MID 30 at the start of use of the vehicle.

Embodiment 1

According to the configuration of the first embodiment, as described above, it is possible to shorten the time required to complete the activation of the RTOS 103 as compared with the case where the temporary allocation is not performed. Therefore, when the integrated ECU 10 is activated, the priority application executed by the RTOS 103 can be executed more quickly. As a result, the display content to be displayed quickly when the integrated ECU 10 is activated can be displayed more quickly.

Further, since the plurality of physical cores 1011 to 1014 included in the physical processor 101 are abstracted into virtual cores by the virtualization technology, the resources of the physical processor 101 are temporarily concentrated on the RTOS 103 by temporary allocation. According to the configuration of the first embodiment, after the temporary allocation is completed, the virtual core allocation is changed so as to allocate the unique physical core to each of the RTOS 103 and the general-purpose OS 104, so that the reliability of each OS is improved.

As a result, when a technology that enables multiple operating systems to operate in parallel is used for a vehicular control device that displays on a display in the vehicle compartment, it becomes possible to display the display content that should be displayed quickly when the vehicular control device is activated while improving the reliability of these operating systems.

Second Embodiment

In the first embodiment, a configuration is shown in which the kernel used by the hypervisor 102, which is virtualization software, and the RTOS 103 operating on the hypervisor 102 is common, alternatively, the present embodiment may not be necessarily limited to this. For example, the OS used by the virtualization software may have a configuration that is not common to the kernel used by any OS running on the virtualization software (hereinafter, embodiment 2). The vehicular display system 1 of the second embodiment is similar to the vehicular display system 1 of the second embodiment, except that the conceptual configuration of the physical processor 101 is partially different.

Figure 8:
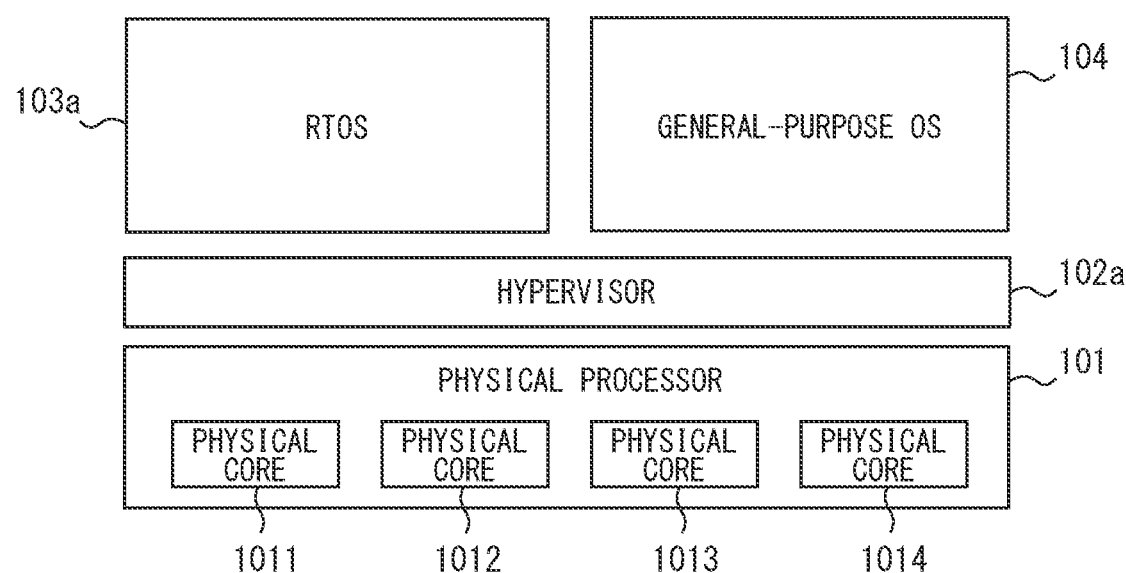
FIG. 8 is a diagram showing an example of a conceptual configuration of a physical processor of the main microcomputer according to the second embodiment.

Here, an example of the conceptual configuration of the physical processor 101 according to the second embodiment will be described with reference to FIG. 8. Here, a case where a hypervisor (Hypervisor) is used as the virtualization software and an RTOS 103*a* and a general-purpose OS 104 are used as the two OSs will be described as an example. The kernel of the hypervisor 102*a* is not common to both the RTOS 103*a* and the general-purpose OS 104. The hypervisor 102*a* and RTOS 103*a* are similar to the hypervisor 102 and the RTOS 103 of the first embodiment, except that the kernels are not common to each other.

The RTOS 103*a* may be, for example, QNX. The general-purpose OS 104 may be, for example, Linux. The main microcomputer 100 mounts a hypervisor 102*a* on a physical processor 101 including four physical cores 1011, 1012, 1013, and 1014. Hereinafter, the case where the physical cores 1011 to 1014 of the present embodiment do not execute two threads in parallel on one physical core will be described as an example. Therefore, the physical cores 1011 to 1014 are logical cores, respectively.

The hypervisor 102a can operate the RTOS 103a and the general-purpose OS 104 in parallel on the virtual core from which the physical processor 101 is extracted. Here, the hypervisor 102a and the RTOS 103a do not have a common kernel as described above. This RTOS 103a also corresponds to the first operating system.

In the first embodiment, the hypervisor 102 and the RTOS 103 have a common kernel, while the hypervisor 102 and the general-purpose OS 104 do not have a common kernel. Therefore, when the integrated ECU 10 is activated, the preparation for activating the RTOS 103 starts prior to the preparation for activating the general-purpose OS 104. On the other hand, in the second embodiment, since neither the RTOS 103a nor the general-purpose OS 104 has the same kernel as the hypervisor 102a, it is necessary to start the preparation for activating the RTOS 103a before the preparation for activating the general-purpose OS 104 when the integrated ECU 10 is activated.

Therefore, in the second embodiment, the activation instruction unit 1022 of the hypervisor 102a starts the activation preparation of the RTOS 103a when the construction of the hypervisor 102a proceeds and the activation preparation of the RTOS 103a can be started. Further, the activation instruction unit 1022 of the hypervisor 102a prevents the general-purpose OS 104 from starting the activation preparation before starting the activation preparation of the RTOS 103. The RTOS103a is similar to the RTOS103 of the first embodiment except that the virtualization software for operating the RTOS103a and the RTOS 103a do not have the common kernel. Further, since the kernel of the hypervisor 102a and the kernel of the RTOS 103a are not common, the allocation unit 1021 of the hypervisor 102a may perform the function without depending on the control of the RTOS 103a.

According to the configuration of the second embodiment, the resource of the physical processor 101 is temporarily concentrated on the RTOS 103a by temporary allocation when the integrated ECU 10 is activated, which is the same as the configuration of the first embodiment Similar to the first embodiment, when a technology that enables multiple operating systems to operate in parallel is used for a vehicular control device that displays on a display in the vehicle compartment, it becomes possible to display the display content that should be displayed quickly when the vehicular control device is activated while improving the reliability of these operating systems.

Embodiment 3

In the above-described embodiment, the configuration in which the vehicular display system 1 includes two displays, the CID 20 and the meter MID 30, is shown, alternatively, the present embodiment may not be necessarily limited to this. For example, a display other than the CID 20 and the meter MID 30 may be included in the vehicular display system 1. For example, a head-up display may be used instead of the meter MID30.

Embodiment 4

In the above-described embodiment, an example of operating two OSs in parallel on virtualization software has been shown, alternatively, the present embodiment may not be necessarily limited to this. There may be three or more OSs operating in parallel.

The control device, control unit and the control method described in the present disclosure may be implemented by a special purpose computer which includes a processor programmed to execute one or more functions executed by computer programs. Alternatively, the control unit and the control method described in the present disclosure may be implemented by a special purpose hardware logic circuit. Alternatively, the control device and the control method described in the present disclosure may be implemented by one or more special purpose computers configured by a combination of a processor executing a computer program and one or more hardware logic circuits. Further, the computer program may be stored in a computer-readable non-transitory tangible storage medium as instructions executed by a computer.

Here, the process of the flowchart or the flowchart described in this application includes a plurality of sections (or steps), and each section is expressed as, for example, S1. Further, each section may be divided into several subsections, while several sections may be combined into one section. Further, each section thus configured can be referred to as a device, module, means.

Although the present disclosure has been described with reference to exemplary embodiments, it is understood that the present disclosure is not limited to such exemplary embodiments and structures. The present disclosure incorporates various modifications and variations within the scope of equivalents. In addition, various combinations and forms, and further, other combinations and forms including only one element, or more or less than these elements are also within the sprit and the scope of the present disclosure.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes sections (also referred to as steps), each of which is represented, for instance, as S1. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A vehicular control device of a vehicle comprising:
a physical processor that executes a plurality of operating systems in parallel on virtualization software by virtualization technology, wherein:
an activation trigger of the vehicular control device occurs when a user starts to use the vehicle;
the physical processor includes a plurality of physical processor cores which are abstracted into virtual processor cores by the virtualization technology;
the plurality of the operating systems includes:
a first operating system, which is a real-time operating system for executing a priority application that is an application for displaying a display content to be displayed on a display arranged in a vehicle compartment of the vehicle preferentially when the vehicular control device is activated; and
a second operating system, which is a general-purpose operating system, wherein prior to an occurrence of the activation trigger, the first operating system has an allocation of a first preliminary amount of the virtual processor cores and the second operating system has an allocation of a second preliminary amount of the virtual processor cores;
when the activation trigger occurs to activate the first operating system and the second operating system, the first operating system has an allocation of a first temporary amount of the virtual processor cores and the second operating system has an allocation of a second temporary amount of the virtual processor cores, wherein the first temporary amount of the virtual processor cores is more than the first preliminarily amount of the virtual processor cores and the second temporary amount of the virtual processor cores is less than the second preliminary amount of the virtual processor cores;
the first operating system executes the priority application on the physical processor using the allocation of the first temporary amount of the virtual processor cores;
the first temporary allocation and the second temporary allocation are terminated after completion of the execution of the first operating system; and
after the termination of the first temporary allocation and the second temporary allocation completes, the first operating system has the allocation of the first preliminary amount of the virtual processor cores, the second operating system has the allocation of the second preliminary amount of the virtual processor cores, and each of the first operating system and the second operating system has an allocation of a respective unique physical core from the plurality of physical processor cores.

2. The vehicular control device according to claim 1, wherein:
the first temporary allocation and the second temporary allocation are further terminated when the activation of the priority application is completed.

3. The vehicular control device according to claim 2, wherein:
each of the first operating system and the second operating system has a respective operating-time allocation amount, after the activation of the priority application is completed; and
the operating-time allocation amounts are equal to the first preliminary amount and the second preliminary amount of the virtual processor cores respectively.

4. The vehicular control device according to claim 1, wherein:
each of the first operating system and the second operating system has a respective operating-time allocation amount, after the activation of the first operating system and the second operating system is completed; and
the operating-time allocation amounts are equal to the first preliminary amount and the second preliminary amount of the virtual processor cores, respectively.

5. The vehicular control device according to claim 4, wherein physical processor cores that share a cache are associated with a same operating system.

6. The vehicular control device according to claim 1, wherein:
the first temporary allocation begins before a preparation for activating the second operating system is started.

7. The vehicular control device according to claim 6, wherein:
the first operating system uses a kernel common to the virtualization software;
the second operating system does not use a kernel common to the virtualization software; and
when the activation trigger occurs, a preparation for activating the first operating system is started before the preparation for activating the second operating system.

8. The vehicular control device according to claim 1, wherein when the activation trigger occurs, the first temporary amount of the virtual processor cores is equal to all of the virtual processor cores and the second temporary amount of the virtual processor cores is equal to zero.

9. The vehicular control device according to claim 1, wherein the activation trigger further includes at least one of a rise in a power supply voltage of the vehicle above a predetermined level or acquisition of a wake-up signal from an in-vehicle LAN.

10. The vehicular control device according to claim 1, wherein the activation trigger further occurs when at least one of:
the vehicle is activated by the user turning on a power switch of the vehicle for starting the vehicle; or
a vehicle door of the vehicle is opened.

11. A vehicular display control method executed by a vehicular control device of a vehicle, the vehicular display control method comprising:
abstracting a plurality of physical processor cores, included in a physical processor into virtual processor cores by virtualization technology; and
executing a plurality of operating systems in parallel on virtualization software by the virtualization technology;
when an activation trigger of the vehicular control device occurs when a user starts to use the vehicle to activate a first operating system and a second operating system, the first operating system has an allocation of a first temporary amount of the virtual processor cores and the second operating system has an allocation of a second temporary amount of the virtual processor cores, wherein the first temporary amount of the virtual processor cores is more than a first preliminarily amount of the virtual processor cores as and the second temporary amount of the virtual processor cores is less than a second preliminary amount of the virtual processor cores, wherein:
the plurality of the operating systems includes:
the first operating system, which is a real-time operating system for executing a priority application that is an application for displaying a display content to be displayed on a display arranged in a vehicle compartment of the vehicle preferentially when the vehicular control device is activated; and a second operating system as, which is a general-purpose operating system, wherein prior to an occurrence of the activation trigger, the first operating system has the allocation of the first preliminary amount of the virtual processor cores and the second operating system has the allocation of the second preliminary amount of the virtual processor cores;

executing, by the first operating system, the priority application on the physical processor using the allocation of the first temporary amount of the virtual processor cores;

terminating the first temporary allocation and the second temporary allocation after completion of the execution of the first operating system; and after completing the terminating of the first temporary allocation and the second temporary allocation, the first operating system has the allocation of the first preliminary amount of the virtual processor cores, the second operating system has the allocation of the second preliminary amount of the virtual processor cores, and each of the first operating system and the second operating system has an allocation of a respective unique physical core from the plurality of physical processor cores.

12. The vehicular display control method according to claim 11, wherein the activation trigger further includes at least one of a rise in a power supply voltage of the vehicle above a predetermined level or acquisition of a wake-up signal from an in-vehicle LAN.

13. The vehicular display control method according to claim 11, wherein the activation trigger further occurs when at least one of:

the vehicle is activated by the user turning on a power switch of the vehicle for starting the vehicle; or a vehicle door of the vehicle is opened.

14. The vehicular display control method according to claim 11, wherein:

the first temporary allocation and the second temporary allocation are further terminated when the activation of the priority application is completed.

15. The vehicular display control method according to claim 14, wherein:

each of the first operating system and the second operating system has a respective operating-time allocation amount after the activation of the priority application is completed; and the operating-time allocation amounts are equal to the first preliminary amount and the second preliminary amount of the virtual processor cores respectively.

16. The vehicular display control method according to claim 11, wherein:

each of the first operating system and the second operating system has a respective operating-time allocation amount after the activation of the first operating system and the second operating system is completed; and the operating-time allocation amounts are equal to the first preliminary amount and the second preliminary amount of the virtual processor cores respectively.

17. The vehicular display control method according to claim 16, wherein:

physical processor cores that share a cache are associated with a same operating system.

18. The vehicular display control method according to claim 11, wherein:

the first temporary allocation begins before a preparation for activating the second operating system is started.

19. The vehicular display control method according to claim 17, wherein:

the first operating system uses a kernel common to the virtualization software;

the second operating system does not use a kernel common to the virtualization software; and when the activation trigger occurs, a preparation for activating the first operating system is started before the preparation for activating the second operating system.

20. The vehicular display control method according to claim 11, wherein when the activation trigger occurs, the first temporary amount of the virtual processor cores is equal to all of the virtual processor cores and the second temporary amount of the virtual processor cores is equal to zero.

* * * * *